(12) United States Patent
Ewald et al.

(10) Patent No.: US 11,071,936 B2
(45) Date of Patent: Jul. 27, 2021

(54) FILTER WITH PERFORATED SEPARATOR PLATES

(71) Applicant: Carl Freudenberg KG, Weinheim (DE)

(72) Inventors: Christian Ewald, Rimbach (DE); Juergen Becker, Zeiskam (DE)

(73) Assignee: CARL FREUDENBERG KG, Weinheim (DE)

( * ) Notice: Subject to any disclaimer, the term of this patent is extended or adjusted under 35 U.S.C. 154(b) by 192 days.

(21) Appl. No.: 16/382,223

(22) Filed: Apr. 12, 2019

(65) Prior Publication Data
US 2020/0030733 A1    Jan. 30, 2020

(30) Foreign Application Priority Data
Jul. 25, 2018    (EP) ..................... 18185376

(51) Int. Cl.
*B01D 46/10*    (2006.01)
*B01D 46/52*    (2006.01)
*B01D 46/00*    (2006.01)

(52) U.S. Cl.
CPC ......... *B01D 46/10* (2013.01); *B01D 46/0005* (2013.01); *B01D 46/0023* (2013.01); *B01D 46/523* (2013.01)

(58) Field of Classification Search
CPC .. B01D 46/10; B01D 46/523; B01D 46/0005; B01D 46/0023; B01D 46/0019
See application file for complete search history.

(56) References Cited

U.S. PATENT DOCUMENTS

| | | | |
|---|---|---|---|
| 3,747,772 A * | 7/1973 | Brown | B01D 29/012 210/493.1 |
| 3,941,571 A | 3/1976 | Getzin | |
| 4,610,706 A | 9/1986 | Nesher | |
| 2008/0006575 A1 | 1/2008 | Berntsson et al. | |

FOREIGN PATENT DOCUMENTS

| | | |
|---|---|---|
| DE | 1761318 A1 | 3/1972 |
| DE | 2557444 A1 | 10/1976 |
| JP | 2002166113 A | 6/2002 |

\* cited by examiner

*Primary Examiner* — Robert A Hopkins
(74) *Attorney, Agent, or Firm* — Leydig, Voit & Mayer, Ltd.

(57) ABSTRACT

A filter for cleaning air includes: a housing; layers of a filter medium, the layers being arranged in the housing; and separator plates. One separator plate is arranged between each two layers of the filter medium. The separator plates are provided with a perforation. In an embodiment, the separator plates are fluted, corrugated, or folded.

10 Claims, 2 Drawing Sheets

FILTER WITH PERFORATED SEPARATOR PLATES

CROSS-REFERENCE TO PRIOR APPLICATION

Priority is claimed to European Patent Application No. EP 18 185 376.3, filed on Jul. 25, 2018, the entire disclosure of which is hereby incorporated by reference herein.

FIELD

The invention relates to a filter for purifying air and a method for manufacturing a separator plate for such a filter.

BACKGROUND

Filters in the form of cassettes are known from the prior art. In U.S. Pat. No. 4,610,706 B, for example, a cassette filter is shown as a HEPA filter. The filter has a large number of filter mats arranged in parallel to each other, wherein separators are used to keep the filter mats at a distance from each other. The separators consist of filter material structured in zigzag form.

In the field of application of high-temperature filters, such a filter cannot be used, and separators made of metal plates, which are positioned between filter mats, are used. The metal plates can be folded (for example, pleated), fluted, or corrugated. They are, advantageously, able to withstand high temperatures, but have a high weight, which increases the total weight of the filter. This makes the filter more difficult to handle—especially if the filter is replaced. High masses must also be disposed of after the exchange of the filter.

A general disadvantage of using separators is that they influence the air flow along the filter mats and reduce the volume flow through the filter.

SUMMARY

In an embodiment, the present invention provides a filter for cleaning air, comprising: a housing; layers of a filter medium, the layers being arranged in the housing; and separator plates, wherein one separator plate is arranged between each two layers of the filter medium, and wherein the separator plates are provided with a perforation.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
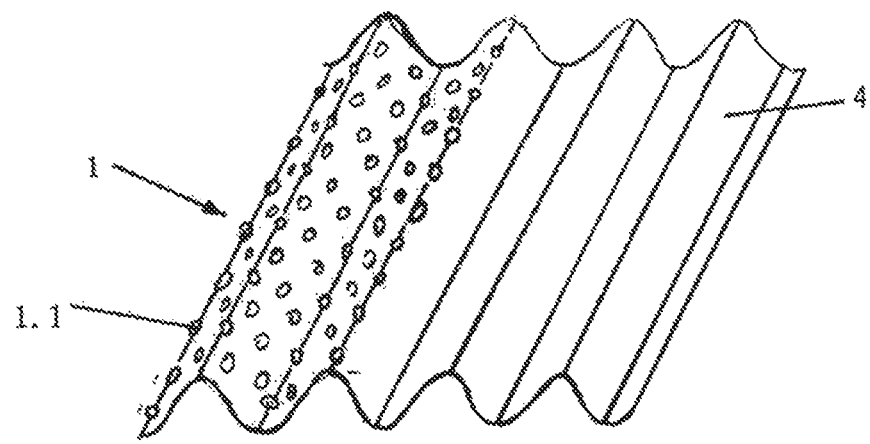
FIG. 1 a separator plate for a filter according to the invention

In an embodiment, the present invention provides a filter that allows a high volume flow of air that is to be filtered. An additional aim is to create a filter that is lighter in weight, to ensure easier handling.

The filter according to the invention serves the purpose of cleaning air flowing through, and has a frame-shaped housing and layers, arranged in the housing, of a filter medium, and separator plates, wherein the layers of the filter medium are aligned in the direction of flow and, between each two layers of the filter medium, a separator plate is arranged, which acts as a spacer between the two layers of the filter medium. The layers of the filter medium preferably can be aligned in parallel to each other, or approximately parallel at a small angle of up to 1° relative to each other. According to the invention, it was recognized as advantageous to provide the separator plates with a perforation, i.e., the separator plates have a large number of holes over their surface. In an advantageous manner, this can improve the flow conditions of the air in the filter and, in particular, reduce the flow resistance. At the same time, a maximum dust-holding capacity of the filter is guaranteed. An additional advantage is that the perforation reduces the weight of the filter, making it easier to handle, i.e., more ergonomic. An additional advantage arises at the end of the filter's life, when it has to be disposed of; disposal and disposal logistics result in a lower waste mass. The filter performance can be improved by improving the flow behavior in the filter.

If the total weight of the filter is not considered problematical in possible applications, the material thickness and thus the tensile strength of the separator plates can be increased owing to the perforation, if the weight remains unchanged compared to unperforated separator plates.

In a particularly advantageous and therefore preferred development, the separator plates of the filter are fluted, corrugated, or folded over their surface (for example, pleated), and consist of a thick foil or a thin plate. The height of the fluting, corrugation, or folds then effects the distance between the two layers of the filter medium.

It is particularly advantageous if the separator plates are made of aluminum. Such separator plates are relatively light and, at the same time, exhibit good stability and tensile strength.

The holes of the perforation can be formed in different shapes: rounded, e.g., circular or oval, or even angular, e.g., square or in honeycomb form, as with a hexagonal honeycomb.

In an advantageous development of the filter according to the invention, a respective separator plate is provided with a progressive, i.e., increasing, perforation.

The perforation is thereby such that the relative surface proportion of the holes increases towards the downstream end compared to the upstream end of the separator plate. Progressive perforation can thereby be achieved by varying the density of the holes (that is, the number of holes per surface), or by varying the size of the holes across the surface. The progressive perforation allows the flow behavior in the filter to be further optimized, and the flow velocity of the air to be equalized from the upstream end to the downstream end of the filter. This allows the filtration performance to be further increased in an advantageous manner.

In a particularly advantageous and therefore preferred design of the filter, the filter medium is pleated and/or made of a glass fiber medium—for example, a glass fiber paper or a micro glass fiber paper. In an advantageous manner, such a filter has a large effective filtration area and can also be used at higher temperatures of the air to be filtered.

In an advantageous manner, the filter can be a cassette filter. In particular, a HEPA filter for use in clean room facilities in the food and pharmaceutical industries, in microchip production, or in clinics.

The filter could also be designed as a high-temperature filter for applications above 100 degrees Celsius. For this purpose, aluminum can be used as the material for the separators, and glass fiber paper can be used as the filter material. Such a high-temperature filter can be used, for example, in industrial drying systems such as paint drying systems in the automotive industry.

The invention also relates to a method for producing a separator plate for a filter as described above. According to a first method variant, in a first step, a perforation is introduced into a flat plate. For this purpose, a thin aluminum plate can be guided over a punching tool, for example. As an alternative to punching the holes, they could also be drilled. The perforated plate is then set aside or transported further. In the subsequent step, the perforated plate is fluted, corrugated, or folded (for example, pleated), i.e., provided with a three-dimensional structure. According to this method variant, the processing thus takes place in different processing stations.

In a second method variant, processing takes place in a processing machine in a single pass; during the fluting, corrugation, or folding (for example, pleating) of a plate, a perforation is made in the plate at the same time. Such an in-line process allows a particularly cost-effective production of the separator plates in an advantageous manner. In both method variants, a plate in either arch form or in roll form can be used as the starting material for the manufacturing processes. If a plate is used in roll form, it must still be cut to length, and the separator plate must be cut to the correct length.

The described invention and the described advantageous developments of the invention in combination with one another, insofar as this is technically sensible, also constitute advantageous developments of the invention.

Figure 2:
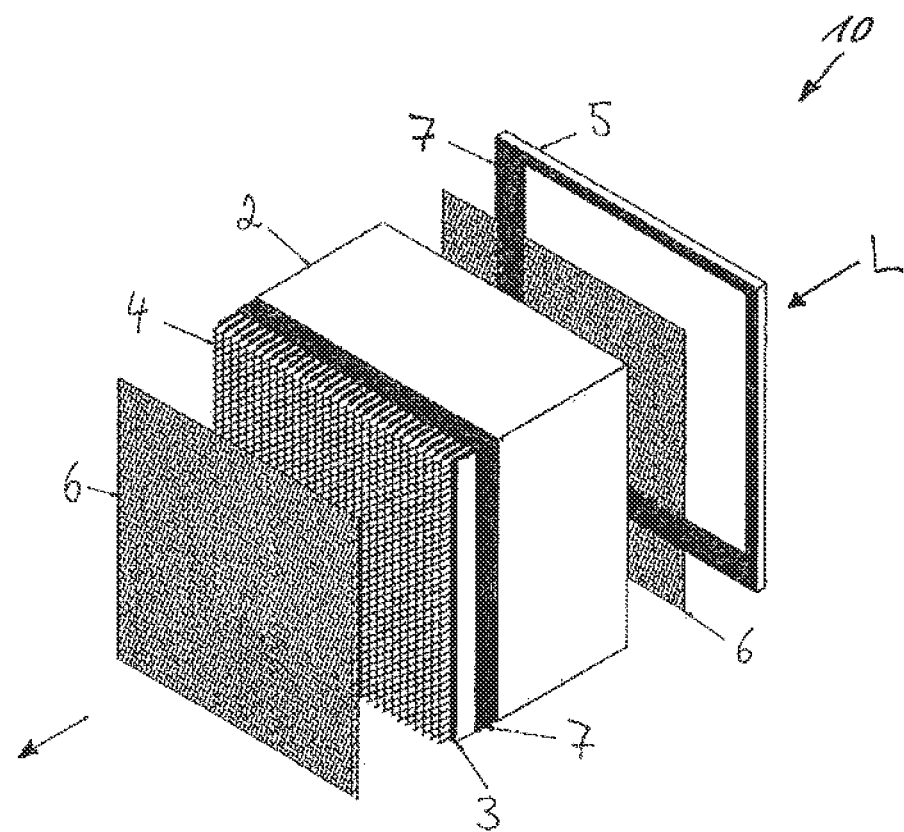
FIG. 2 a filter in an overview display

FIG. 1 shows a separator plate 4 for a filter 10 according to the invention. The separator plate 4 is corrugated and provided with a perforation 1 over its surface. The perforation 1 consists of a large number of holes 1.1, which are introduced into the separator plate 4. For the purpose of better clarity, only a portion of holes 1.1 of the perforation 1 has been shown. Such a separator plate 4 can be inserted in a filter 10, as shown in FIG. 2. The filter 10 has a housing 2 in which a large number of layers of filter medium 3 are arranged in the direction of the air flow L. In the embodiment shown, the layers of filter medium 3 are arranged in parallel to each other. A separator plate 4 is fitted between each two layers of the filter medium 3, which separator plate acts as a spacer between the two layers of the filter medium 3, such that two layers of filter medium 3 do not abut each other; rather, an air flow L can always be led past the layers of the filter medium 3, and, by this, the air flow L can be filtered. On the inflow side, the filter 10 is additionally equipped with a frame 5. On both the upstream and downstream sides, the layers of the filter medium 3 are each protected by a metal grating 6, which acts as handle protection and thus prevents the filter medium from being damaged when the filter 10 is handled. The filter 10 shown in FIG. 2 is inserted for its use into a filter holder. The filter 10 is provided with a seal 7 so that the air flow L is guided exclusively through the filter 10, and forms no bypass between the filter 10 and the filter holder.

Figure 3A:
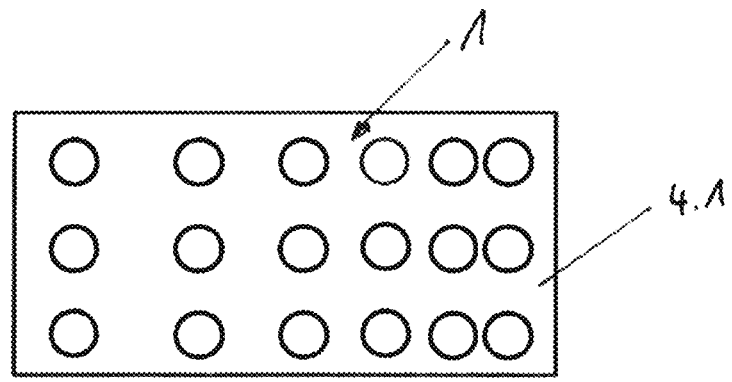
FIG. 3a a first variant of a perforation
Figure 3B:
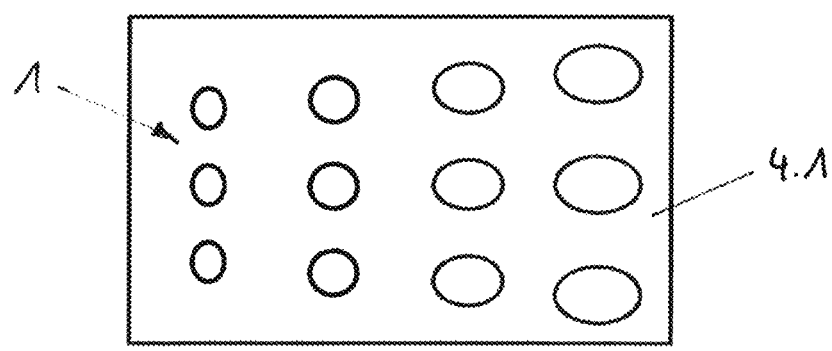
FIG. 3b a second variant of a perforation

FIGS. 3a and 3b show two different variants of a plate 4.1 for the production of a separator plate 4, wherein both plates 4.1 are provided with a progressive perforation 1. In the variant shown in FIG. 3a, the progressive perforation 1 is achieved by varying the density of the holes 1.1. In the variant according to FIG. 3b, the progressive perforation 1 is achieved by varying the size of holes 1.1. In both figures, the upstream side is on the left and the downstream side is on the right, i.e., an air flow L would be passed from left to right on the separator plate 4.

In the embodiment shown, the plate 4.1 has not yet been fluted, corrugated, or pleated. This structuring would take place in a subsequent process step.

Figure 4:
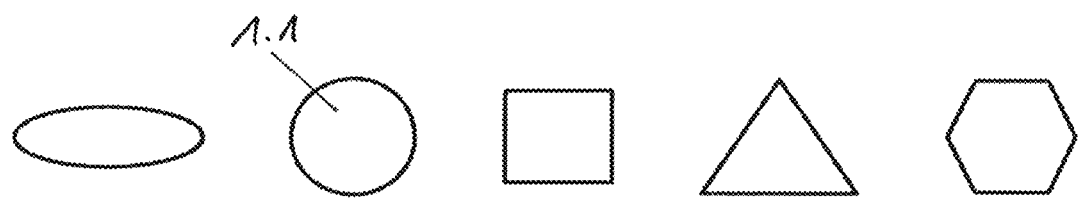
FIG. 4 different hole geometries

FIG. 4 shows different geometric designs of holes 1.1. It is possible, for example, that the holes in the perforation 1 have a round shape—for example, an oval or a circular shape. Alternatively, it is possible that the holes in the perforation have an angular shape—for example, square, triangular, or hexagonal. The enumeration and presentation of possible shapes of holes at this point is to be understood as merely exemplary and not as conclusive.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Perforation
1.1 Hole
2 Housing
3 Layer of filter medium
4 Separator plate
4.1 Plate
5 Frame
6 Metal grating
7 Seal
10 Filter
L Air flow

What is claimed is:
1. A filter for cleaning air, comprising:
a housing;
layers of a filter medium, the layers being arranged in the housing; and
separator plates,
wherein one separator plate is arranged between each two layers of the filter medium, and wherein the separator plates are provided with a perforation.

2. The filter according to claim 1, wherein the separator plates are fluted, corrugated, or folded.

3. The filter according to claim 1, wherein the separator plates are comprised of aluminum.

4. The filter according to claim 1, wherein the perforation comprises holes that are rounded or angular.

5. The filter according to claim 1, wherein a respective separator plate is provided with a progressive perforation comprising holes, such that a relative surface proportion of the holes on the separator plate increases towards a downstream end of the filter and such that the progressive perforation is achieved by varying a density of the holes or by varying a size of the holes.

6. The filter according to claim 1, wherein the filter medium is pleated and/or comprised of a glass fiber medium.

7. The filter according to claim 1, wherein the filter comprises a cassette filter.

8. The filter according to claim 1, wherein the filter comprises a high-temperature filter.

9. A method for producing a separator plate for the filter according to claim 1, the method comprising the following steps:
   inserting a perforation into a flat plate; and
   fluting, corrugating, or folding of the flat plate.

10. The method of according to claim 9, wherein the perforation is introduced into the flat plate during the fluting, corrugation, or folding of the flat plate.

* * * * *